March 10, 1970 W. HURTES 3,499,807
METHOD FOR MANUFACTURING AN ARTICLE HAVING A NON-WOVEN PILE
Filed Sept. 27, 1965 3 Sheets-Sheet 1
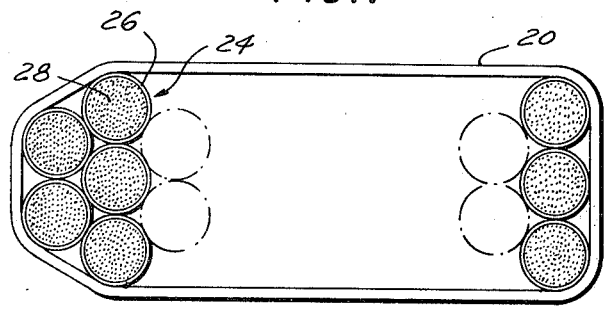
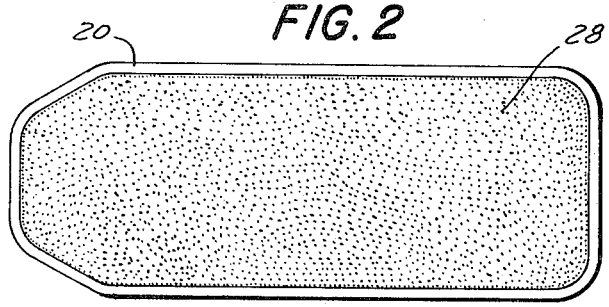
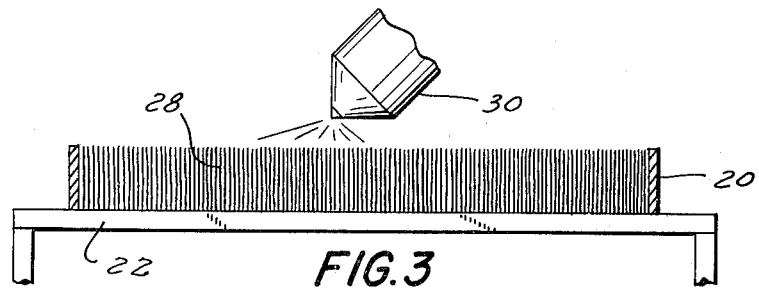
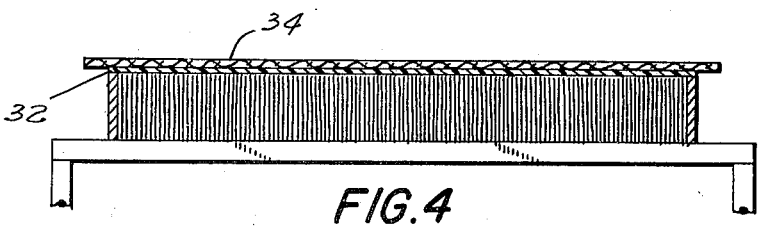
INVENTOR
WALTER HURTES
BY
Steinberg & Blake
ATTORNEYS March 10, 1970     W. HURTES     3,499,807
METHOD FOR MANUFACTURING AN ARTICLE HAVING A NON-WOVEN PILE
Filed Sept. 27, 1965     3 Sheets-Sheet 2
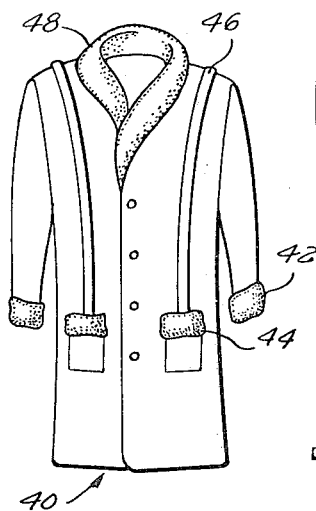
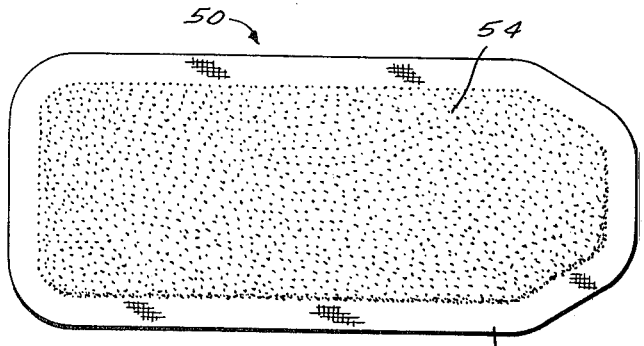
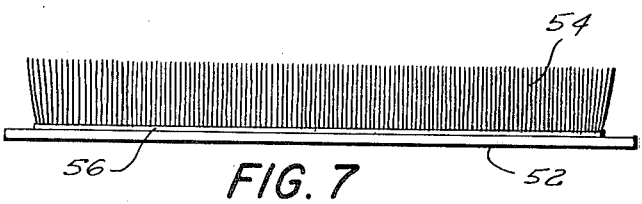
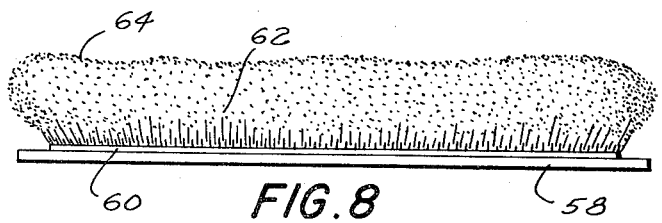
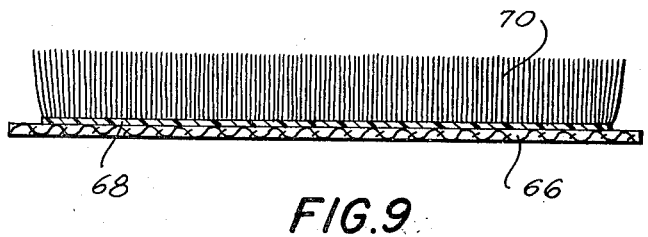
INVENTOR
WALTER HURTES
BY
Steinberg & Blake
ATTORNEYS

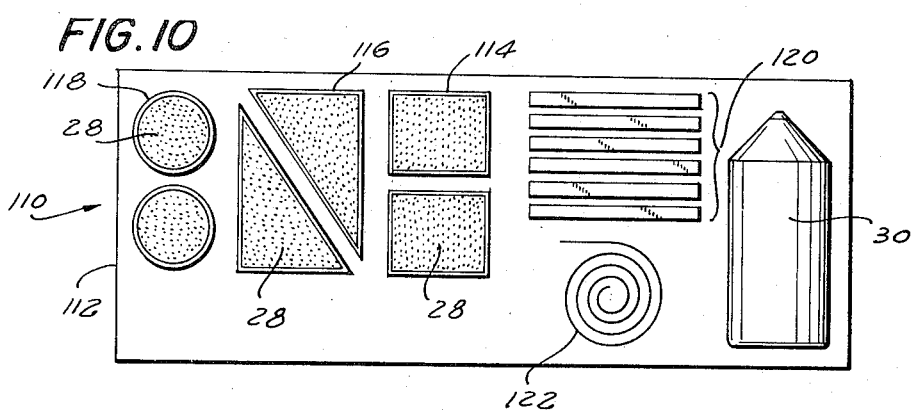
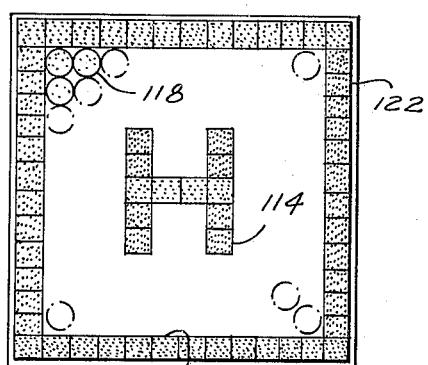
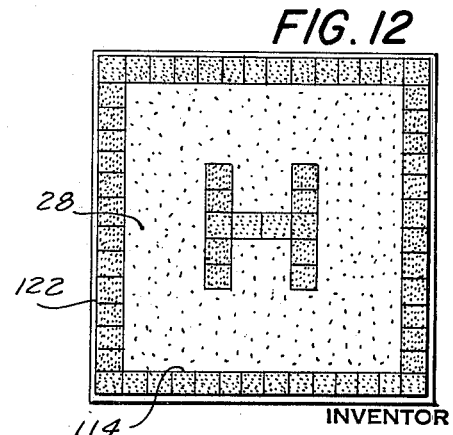

United States Patent Office 3,499,807
Patented Mar. 10, 1970

3,499,807
METHOD FOR MANUFACTURING AN ARTICLE HAVING A NON-WOVEN PILE
Walter Hurtes, 433 W. 34th St., New York, N.Y. 10001
Filed Sept. 27, 1965, Ser. No. 490,347
Int. Cl. B32b 5/00; A41d 27/00
U.S. Cl. 156—72      8 Claims

ABSTRACT OF THE DISCLOSURE

A method for manufacturing an article having a non-woven pile. A plurality of flexible sleeves which have opposed open ends are filled with yarns which press against each other in each sleeve and which have a length substantially equal to that of the sleeve. This sleeve length is sufficiently great, as compared with the cross-sectional area of the sleeve and pressure of the yarns, to maintain the yarns stably within the sleeve.

These yarn-filled sleeves are placed in side-by-side relation within a given area in which they are pressed against each other with the ends of the yarns exposed. Then the sleeves are removed so as to leave the yarns themselves pressing against each other in side-by-side relation within the confining area. A suitable support is adhered to the yarns at one of the exposed ends thereof, so that thereafter the yarns can be removed from the confining area with the support which adheres thereto, thus forming therewith an article which has a non-woven pile.

---

The present invention relates to fabrics.

More particularly, the present invention relates to pile fabrics.

It is known to make certain fabrics of a pile construction by forming loops from a yarn which is passed through a suitable backing. Such structures are known for rugs and the like. The necessity of passing the pile-forming yarn through the backing is of course a great drawback with such pile fabrics, and it has therefore already been proposed to form articles having non-woven pile where the yarns which form the pile are adhesively joined to the backing, for example. However, articles of this latter type require at the present time exceedingly expensive, complex and bulky machinery adapted only to manufacture such fabrics on a large scale. Thus, while machinery of the latter type may be suitable for manufacturing articles of relatively large size, such as rugs and the like, with a non-woven pile, it is not economically feasible to use such machines for manufacturing relatively small articles with a non-woven pile.

It is accordingly a primary object of the present invention to provide a method for manufacturing relatively small articles with non-woven pile at a relatively low cost making it economically feasible to market such articles in competition with similar articles manufactured by conventional methods.

Another object of the invention is to provide a method according to which articles of this type can be quickly and inexpensively manufactured.

Furthermore, it is an object of the invention to provide a method which without any difficulty can be altered so as to produce articles of almost any desired configuration and design.

In addition, it is an object of the invention to provide a method for manufacturing garment trimmings or even an entire garment having a non-woven pile.

In addition, it is an object of the invention to provide an exceedingly simple structure capable of being easily manipulated in a variety of ways to provide a non-woven pile article.

The invention is illustrated by way of example in the accompanying drawings which form part of the application and in which:

FIG. 1 is a top plan view schematically illustrating a structure used during performance of the method of the invention;

FIG. 2 is also a somewhat schematic top plan view showing a stage of the method subsequent to that illustrated in FIG. 1;

FIG. 3 is a schematic longitudinal section of the structure illustrated in FIG. 2 and shown in FIG. 3 at a still further stage of the method of the invention;

FIG. 4 is also a longitudinal sectional illustration showing schematically almost the last step of the method of the invention;

FIG. 5 is a schematic representation of a garment incorporating trimmings of the present invention;

FIG. 6 shows in a plan view a representative trimming of the invention;

FIG. 7 is a side elevation of the article of FIG. 6;

FIG. 8 shows in side elevation a somewhat different embodiment of a trimming according to the invention;

FIG. 9 is a longitudinal sectional illustration of yet another embodiment of a trimming according to the invention;

FIG. 10 is a schematic representation of a kit which may be used in the home to manufacture decorative articles in accordance with the present invention;

FIG. 11 illustrates how the kit of FIG. 10 may be used, FIG. 11 showing an article at an intermediate stage of completion; and FIG. 12 illustrates the articles of FIG. 11 during a further stage in the method of manufacture thereof.

Referring now to FIGS. 1–4, there is illustrated therein the method of the present invention for manufacturing articles according to the invention. In accordance with the invention a confining means 20 is provided, this confining means 20 surrounding an area of a predetermined configuration. The configuration of this area indicated in FIGS. 1 and 2 is intended to be purely haphazard. The area which is surrounded by the confining means 20 can be circular, square, polygonal, elongated, tapering, curved in any desired manner, and the representation of FIGS. 1 and 2 is simply a schematic haphazard illustration of one of an infinite number of possible configurations which can be chosen according to the invention.

The confining means 20 can take the form of an endless ban such as that shown in FIGS. 1–4. Thus, in the illustrated example this endless band may be a deformable elongated endless strip of metal or plastic which will retain its shape while being capable of deformation into any desired shape with application of a suitable force to the endless strip 20. Many metals will behave in this manner as well as plastics which can be heated so as to be rendered deformable and then upon cooling will set in the desired configuration. However, it is also possible to use a plurality of elongated separate strips which may be simply strips of wood or the like which are assembled together to provide an inner endless surface extending along and defining an area of a given configuration. As may be seen from FIGS. 3 and 4, the confining means 20 is mounted on any suitable support such as the tabletop 22. When dealing with somewhat larger articles a floor of a room can be used instead of a tabletop 22.

In accordance with the invention, once the confining means 20 is set up to provide an area of preselected size and configuration, this area is filled with the basic units 24 of the present invention. These basic units are made up of a sleeve 26 and a plurality of yarns 28 situated within the sleeve. The sleeve 26 has opposed open ends and is made of any flexible sheet material. It may be any plastic such as polyethylene, polyvinyl chloride, polystyrene, etc., or it may be a fabric tube, and even flexible metal tubes will suffice.

A group of yarns 28 is situated in each tube 26 of the unit 24 with these yarns pressed against each other with a substantial force so that the group is compacted to some extent while situated within the sleeve 26. The length of the yarns 28 corresponds to the length of the tube 26, and this length preferably is a substantial fraction of the diameter of the tube so that it will be self-sustaining. In other words no matter how tightly the yarns are compressed against each other in the tube 26, if the length thereof is a relatively small fraction of its diameter, then when the tube is grasped only at its exterior surface and is raised from a supporting surface the inner contents formed by the yarns 28 can simply fall by gravity out of the interior of the tube, so that such a construction is quite unstable. In accordance with the invention the length of the tube is a sufficiently great fraction of its cross sectional dimensions to guarantee that with the yarns 28 pressing against each other with a relatively small pressure the unit 24 will nevertheless be of sufficient stability to retain the yarns 28 within the tube 26 within the tube 26 when the latter is handled and moved about even though it is completely unsupported except by the hand of the operator. By a relatively small pressure with which the yarns press against each other in the tube 26 is meant a pressure small enough to enable the operator to hold the yarns in a given position and slip the tube 26 off the yarns.

These yarns are situated within the tube 26 in any one of a number of different ways which are immaterial insofar as the present invention is concerned. For example, machines used for manufacturing cigarettes can be adapted to provide the units 24 of the invention. The tubes 26 can be formed in the same way as the paper sleeves of cigarettes, and in fact the tubes 26 can be made of paper if desired. Of course, instead of tobacco elongated yarns are situated within the tubes, and the subsequent structure is cut up into the desired length so as to provide the units 24. Also, it is possible to use well known tube-forming structures which automatically form tubes from strips of flexible sheet material and which simultaneously fill the interior of the tubes, so that in this way also it is possible to continuously form an elongated tube which is simultaneously filled with the yarns 28 extending in the same direction as the axis of the tube, and then subsequently it is sliced up into desired lengths.

The lengths of the units 24 can be of any desired magnitude and will in general be selected according to the article which is to be manufactured. The length of the tubes 26 will, however, correspond approximately to the width of the strip which forms the confining means 20. Therefore, when a group of units 24 are set into the area surrounded by the confining means 20, as indicated in FIG. 1, the upper exposed ends of the yarns 28 will be situated approximately at the same elevation as the upper edge of the structure 20 whose inner surface defines the area which is filled by the tubes 26 with the yarns 28 packed therein. It is to be noted that the tubes 26 are shown as of circular cross section in FIG. 1 only to clearly illustrate that a plurality of separate units 24 are filled into the area surrounded by the structure 20 in side-by-side relation. Because the tubes 26 are flexible they can be packed against each other and will automatically take the shape of the inner surface of the structure 20 and will automatically conform to each other so as to form a fairly complete filling of the space bounded by the structure 20. In this case also the extent to which the space is tightly packed with units 24 will depend upon the article which is to be manufactured. Some articles will require a relatively dense field of pile yarns, and in this case the several units 24 will be very tightly packed into the area surrounded by the structure 20. On the other hand, where a less dense field of pile yarns is required, the units 24 will be more loosely situated in the space defined by the structure 20, so that the resulting article will have the pile yarns thereof situated with respect to each other at a preselected density. This capability of adapting the performance of the method of the invention to the ultimate preselected density of the pile yarns is one of the advantages achieved with the present invention.

After a desired or preselected number of units 24 have been situated next to each other in the area defined by the confining means 20, the operator will slip the sleeves 26 from the yarns 28. This operation is very quickly and easily performed. The operator need only place a thumb on the top exposed ends of the yarns 28 and slip the sleeve 26 up while maintaining the yarns on the tabletop 22 or the like, and in this way sleeve after sleeve is very quickly removed from the yarns 28.

The resulting structure is illustrated in FIG. 2. As is indicated in FIG. 2 various yarns 28 are now confined only by the confining means 20 and the sleeves 26 have been completely eliminated. Because the yarns 28 were initially packed with a predetermined pressure within the sleeves 26, when these sleeves 26 are removed the yarns 28 due to their inherent springiness will push apart from each other and will uniformly fill the space defined by the confining means 20. Thus, in the case where a relatively large number of units 24 has been packed into the space, when the sleeves 26 are removed the yarns 28 will uniformly spread apart from each other to fill the space with a relatively high density, while the units 24 are loosely situated within the space the yarns 28 will again uniformly expand their thickness and spread apart from each other to uniformly fill the space surrounded by the confining means 20, but in this case the density will of course be less. Because the yarns 28 will normally be made of wool, cotton, or the like, they are capable of being compressed in cross section when situated within the sleeve 26, and of course when the sleeve 26 is removed the yarns will, due to their own inherent resiliency, tend to expand their cross sectional area so that they will move apart from each other and uniformly fill the space defined by the confining means 20. This action also will take place automatically because the yarns are made up of twisted fibers which are resilient and which when the compression is removed will expand to occupy a larger space causing the several pile yarns to move apart from each other and provide a uniform field of pile yarns confined by the means 20.

As is indicated in FIG. 3, the next step in the method of the invention is to apply to the top exposed ends of the yarns 28, all of which are located next to each other, a layer of adhesive. This may simply be latex or any other suitable adhesive material. For example, where the desired article is to be washable, certain materials which can withstand the washing operations will be selected, whereas where the articles are to be dry cleaned, for example, other materials which are inert to the dry-cleaning chemicals will be selected for the adhesive layer applied to the exposed top ends of the yarns 28.

Irrespective of the particular composition of the adhesive material, it can be applied in any one of a number of different ways. For example, a suitable roller can have a quantity of the adhesive applied thereto and rolled across the top exposed ends of the yarns 28 to apply the layer thereto. If desired a simple brush similar to a paint brush may be used for painting a layer of adhesive on the top ends of the yarns 28. In the particular example illustrated in FIG. 3 a spray can 30 is used for spraying the adhesive layer onto the top ends of the yarns 28. This spray can may be a conventional aerosol type of container in which a propellant gas at a suitable pressure is situated for discharging the adhesive composition in the form of a spray out of the discharge nozzle when the latter is opened by the operator in a well known manner, and in this simple way it is possible to situate on the top ends of the yarns a layer 32 of adhesive, as indicated in FIG. 4.

The next step in the method of the invention is to apply a backing 34 to the layer of adhesive so that in this way the backing 34 is adhered to the yarns 28. This backing 34 can be any desired material. It can be a woven fabric, a plastic, a natural sheet material such as leather, or it can even be a rigid sheet of plastic, metal, wood, or any other desired material. It is only required that the pile yarns 28 be capable of being adhered to the backing 34.

While the above description refers to a separate backing element, it is also possible to form the backing of the adhesive material itself. In other words, an adhesive material such as latex or urethane can be applied to the exposed ends of the yarns in the manner referred to above, and this adhesive layer can simply be allowed to set and dry so that it will in and of itself form the backing.

In many cases the configuration of the backing 34 will conform generally to the configuration of the confining means 20, and if desired an edge portion of the backing 34 can project slightly beyond the confining means, as indicated in FIG. 4, so that this edge portion can be used for fastening the article to any desired support. Thus, in most cases the backing 34 will conform generally to the area defined by the confining means 20 but may be slightly larger than this area and it will be applied to the ends of the yarns when in alignment with the area defined by the means 20, so that the yarns will be adhered to the backing 34 with, in most case, an edge portion of suitable width extending along the periphery of the backing beyond the field of pile yarns 28.

When the adhesive 32 has set so as to securely unite the yarns with the backing, this backing can simply be raised from its position shown in FIG. 4 so as to remove all of the yarns 28 from their confinement within the confining means 20, and in this way the final article is achieved. The outermost yarns of the group will have a tendency to turn away from their positions extending perpendicularly to the backing 34 so that the group of yarns will further spread apart from each other to provide a fur or carpet effect when the final article is removed from the confining means 20. The extent to which this latter effect is produced will depend upon the extent to which the yarns 28 are compacted within the area defined by the means 20, and as was indicated above the number of units 24 packed into a given area will control the final density of the pile so as to control the effect which is achieved.

Because of the extreme simplicity of the method and apparatus of the invention, as is evident from the above description and FIGS. 1–4, the invention lends itself to economical use in non-mass-produced items in small quantities. One of the articles of the present invention is a trimming suitable for use on a garment. Such trimmings can now be manufactured according to the invention in small quantities and in any desired sizes and configurations in a highly economical manner, so that the trimmings of the invention can be made at a low cost while at the same time having a wide variety of appearances, sizes, and shapes, as desired.

Thus, referring to FIG. 5, there is illustrated therein a garment in the form of a coat 40 which has various types of trimmings thereon. These trimmings in the illustrated example include the cuffs 42, the trimmings 44 extending along the upper edges of the pockets, the gores 46, and the collar 48.

FIGS. 6 and 7 illustrate the structure of any of these trimmings and the configuration of the article shown in FIG. 6 is intended to be a purely haphazard one representative of any desired configuration of a garment trimming according to the invention. The trimming 50 shown in FIGS. 6 and 7 includes a flexible backing 52 made of any suitable sheet material such as a woven fabric, a sheet of plastic, or the like, and to this backing 52 is adhered the field of pile yarns 54. These yarns are fastened to the backing 52 by way of the layer 56 of adhesive material, and of course the article of FIGS. 6 and 7 may be manufactured with the method and apparatus described above and shown in FIGS. 1–4. The free edge of the backing 52 which extends beyond the field of pile yarns 54 enables the backing to be attached to any support as by being sewn to adjoining fabric of the garment 40. Depending upon whether the trimming is to be used for the cuff 42, for the pocket edging 44, for the gore 46, or for the collar 48, the backing 52 will have a predetermined size and configuration and the yarns 54 used for the pile will be selected accordingly.

Thus, in the case of the collar 48, for example, it may be desired to provide a structure such as that shown in FIG. 8. In this case the collar will include a backing 58 of suitable fabric or the like, and a layer of adhesive 60 is used to connect to the collar 58 the pile yarns 62. However, in order to achieve a soft fleecy effect resembling certain types of fur and giving the illusion of warmth and comfort as well as softness, the yarns 62 will be quite long so that a short stubby field of pile yarns is avoided. Instead hair-like long silky yarns 62 will be used, and in the final article the outer free ends 64 of the yarns will lie down against each other extending in the same general direction as the backing 58 to provide the soft, warm, fleecy effect which can be achieved with the invention.

On the other hand, for certain types of collars a more fuzzy, brush-like effect may be desired, and in this case a structure as shown in FIG. 9 may be used. Referring to FIG. 9 it will be seen that the backing 66 has applied thereto a layer of adhesive 68 which is used to attach to the backing 66 the relatively short yarns 70 which have their free ends exposed so as to provide a brush-like effect.

In this way, a comparison of FIGS. 8 and 9 illustrate the range of effects which can be achieved as desired with the invention.

It is furthermore to be noted that in FIG. 9 the backing 66 is illustrated as being a woven fabric. Of course, such a woven fabric may also be used for the backing 58 in FIG. 8. According to a further feature of the invention this backing is woven from the very same yarn which is used for the pile 70 or 62. The result is that in the case of a collar, for example, when the collar is turned up so that its back is visible, this back will have the same color as the pile yarns or the same combination of colors as well as the same texture, so that in this way it is possible to achieve with the invention the very special effects which are very desirable in many different types of garment trimmings.

While mention has been made of trimmings which are constructed according to the invention, various other combinations are possible. For example the entire garment may be made of a suitable flexible backing on which a non-woven pile is mounted in accordance with the invention. Or while the garment is made of a non-woven pile the trimmings can be made of a simple woven fabric which can match the non-woven pile garment. Furthermore, various combinations such as skirts and jackets one of which is made of a non-woven pile and the other of which is made of a matching or contrasting fabric may be provided.

The invention also lends itself to an art form capable of being used to produce decorative articles, for example.

FIG. 10 illustrates one possible example of a kit 110 which may be purchased by any person, who need not be a skilled artist, and used in the home for manufacturing any desired decorative article which will have the structure of a non-woven pile fabric. This kit can include sleeves 114 of square cross section corresponding to the sleeves 26, as well as sleeves 116 of triangular cross section corresponding to the sleeves 26, and of course cylindrical sleeves 118 which may be identical with the sleeves 26 may also be used. All of these sleeves of different cross sectional configurations, and if desired of different lengths and of additional polygonal configurations, in more elaborate kits, are filled with the yarns 28 which are compacted against each other in side-by-side relation to a predetermined degree within the sleeves. Various colors for the yarns 28 may be provided as well as the various configurations and lengths of the sleeves.

The kit will also include a group 120 of suitable backings which can be flexible sheets of fabric, plastic, or the like, which can be cut to any desired configuration by the user.

The kit 110 also includes a confining structure 122 in the form of an elongated flexible strip capable of being deformed so as to assume any desired endless configuration and of sufficiently small resiliency so that it will remain in its deformed condition and will require application of a substantial force for deformation.

The kit will also include, for example, a spray can 30 of the aersol type or the like, as described above, for the purpose of applying an adhesive layer in the manner described above. Any other device such as a simple container and paint brush, for example, may be used for applying the adhesive layer.

The entire kit can be situated in a suitable container 112 in the form of a box or the like, as schematically indicated in FIG. 10.

FIGS. 11 and 12 illustrate the manner in which it is possible to use the kit of FIG. 10. The confining strip 122 will be given a square configuration, for example, and along its inner surface will be situated a line of square sleeves 114 filled with yarns 28 of a given color. In the space surrounded by the frame of sleeves 114 additional sleeves 114 perhaps having therein yarns 28 of a different color than those in the outer frame will be arranged to conform to any desired pattern. In the illustrated example the letter H is shown, but it is to be understood that any other letter of the alphabet or fanciful design may be formed. Of course, only square sleeves 114 are required since they can be grouped together to form elongated rectangles or the like. Where the pattern is to include tapered or pointed portions the triangular sleeves 116 will be used. For example, if a letter A were to be used instead of the letter H, then the triangular sleeves 116 would be used to form the crest or apex at the top of the letter A. Once the desired interior pattern has been provided, the space between the inner pattern and the outer frame is filled with the cylindrical sleeves 118 as indicated schematically in FIG. 11. The entire free space surrounded by the frame of outer sleeves 114 is filled with the cylindrical sleeves 118 which are packed against each other to a given degree within this space, and the proper degree of compacting of the sleeves 118 against each other will be learned by experience. Then the sleeves 118 are removed so as to leave the field of yarns 28 as shown in FIG. 12 filling all of the free space between the central pattern H and the outer frame. It is one of the features of the method of the invention to remove the sleeves 118 before the sleeves 114 are removed, so that in this way the yarns 28 released from the confinement by the sleeves 118 will support the sleeves 114 in their preselected positions, and in this way the preselected pattern of sleeves 114 (or 116 or both) will be maintained by the pressure of the field of yarns 28. Now the sleeves 114 are removed so that all that remains is the field composed entirely of yarns surrounded by the confining frame 122 and having the preselected pattern. The layer of adhesive is now applied to the exposed ends of the yarns and any desired one of the backings 120 is applied so that the final article can, after the adhesive sets, be raised out of the confinement by the strip 122 and in this way the final article is produced. Naturally what has been described above is but one of an infinite number of possibilities of using the method and apparatus of the invention as a new art form.

As was indicated above it is possible to use the floor instead of a table such as the table 22 shown in FIGS. 3 and 4, depending upon the size of the article. In this connection, it is also possible to use the invention for manufacturing a floor covering in situ. All that is required to make a wall-to-wall carpeting according to the invention, for example, is to lay a layer of a suitable backing fabric or the like on the floor, and then to proceed section by section to adhere to such a layer any desired combination or pattern of pile yarns. This may be done, for example, by providing square frames such as those formed by the strip 122. Such a frame can be mounted on one section of the backing which rests on the floor and a suitable adhesive will now be applied to the upper surface of the backing. The nature of the adhesive selected is such that it will not adhere to the material of the sleeves while on the other hand the ends of the yarns will adhere to the layer of adhesive. Such materials which will not adhere to polyethylene, for example, but will adhere to wool or cotton yarns, are well known. When such an adhesive is used it is a simple matter to fill the frame with the units 24 of the invention compacted against each other to the desired degree, since the time required for the adhesive to set with respect to the ends of the yarns applied thereto can be made fairly long. After the selected density and pattern of yarns within the confining frame has been produced on the predetermined section of the floor, the sleeves will be removed to leave the yarns which are permitted to remain long enough so that the adhesive can set, and then the confining means is removed to leave the yarns adhering to the backing on the floor, and the next section can be made in the same way. In this way it is possible of anybody to build up a wall-to-wall floor covering of any desired pattern and pile yarns of any desired materials, colors, height, texture, etc.

Of course, the invention as described above is capable of many further variations. For example, is some cases it may be desired to provide the yarns with predetermined configurations to which they will automatically return after being deflected. Thus, it is possible by known processes involving heat, pressure, and the like to treat the yarns so that they will retain a given curvature, and it is possible to provide pile articles which are not woven, and which will be manufactured according to the invention so as to have the pile yarns themselves capable of resiliently snapping back to any desired configuration after they have been deflected from a predetermined configuration. In this way it is possible in the case of collars, for example, to provide long flowing hair-like yarns similar to those of FIG. 8 which not only will lie against each other to provide a soft appearance and feel, but which is addition will resiliently retain their selected curvature so that even after exposure to weather, rain, or other undesirable influences such as pressure of other garments in a closet, packing in a box, or the like, the yarns will immediately spring back to their preselected curvatures providing the predetermined appearance of the parment trimming of the invention.

As was indicated above, it is possible to control the density of the non-woven pile of the invention in accordance with the degree to which the yarns are compacted within the sleeves and in accordance with the degree to which the yarn-filled sleeves are themselves packed against each other within the confining means before the sleeve are removed, as pointed out above. However, there are various other possibilities for controlling the density of the nonwoven pile. For example, the yarns within the sleeves may be composed of one group of yarns which will not adhere to the particular adhesive applied to the exposed ends of the yarns, while the remainder of the yarns will adhere to the adhesive, so that after the sleeves are removed the entire structure can be inverted and the non-adhering yarns will drop out so as to leave only the adhering yarns remaining, and in this way it is possible to provide a pile of a controlled density. Another possibility is to wind yarns which will adhere to the adhesive about yarns which will not adhere to the adhesive, so that in this case also after the adhesive is applied with the adhesive itself forming the backing or with another backing applied to the adhesive, the cores about which the yarns are wound can be removed simply by dropping away from the adhesive to leave in engagement with each other yarns which initially have the configuration of corkscrews and which engage each other to form a pile of controlled density. With a pile of this latter type the density will be quite low not only because of the spacing between the yarns but also because of their corkscrew configuration which causes them to occupy a relatively large amount of space. The elimination of the undesired yarns which are used only as a temporary filler and are then removed to provide a pile of less density can be brought about in a variety of ways. Not only can these yarns simply drop out upon brushing the pile by hand with the pile in an inverted positon, but in addition it is possible, for example, to mix in with the plastic material used to manufacture the yarns which will not adhere to the adhesive a suitable substance which is magnetic, for example. This substance may be in the form of a graphite powder, for example, or any powder made up at least in part of a ferrous material which will respond to the forces of magnetism, so that with yarns of this type passing of a magnet over the pile will automatically pull out of the pile the yarns which do not adhere to the backing.

It is also possible to control the density of the pile by distributing, through the fabric yarns thereof, a number of plastic yarns which while capable of adhering to the layer of adhesive nevertheless can be dissolved out of the pile. Such yarns can be made of an acetate such as rayon acetate so that thereafter acetone can be used to dissolve away the acetate yarns, thus reducing the density of the pile.

The same expedient can be used for the yarns around which the fabric yarns are coiled in the manner described above.

Also the sleeves which are filled with yarn can be made of a plastic such as acetate and joined with the adhesive. In this case the sleeves can be removed by being dissolved with acetone after the adhesive is applied. This expedient can be used in any of the methods of the invention.

It is thus apparent that according to the basic principle of the present invention a group of yarns is confined in side-by-side relation within an area of a given configuration while being pressed against each other to a given degree with the yarns having exposed ends respectively, situated adjacent each other. The layer of adhesive is applied to these exposed ends and the backing is applied to the layer of adhesive, so that in this way it is possible to produce economically but on a small scale articles of relatively complex configuration, having any desired size or appearance, as indicated above. This basic principle can be applied in a wide variety of manners, as indicated above, to produce a wide variety of articles, also as pointed out above.

What is claimed is:

1. A method of manufacturing an article having a non-woven pile, comprising the steps of arranging in side-by-side relation within a given area bounded by an endless member a plurality of flexible, open-ended sleeves in each of which a plurality of yarns are arranged pressed against each other in side-by-side relation with said yarns in each sleeve respectively having exposed ends located adjacent each other, with said sleeves each having a length great enough to retain the yarns stably therein during handling of the sleeves, pressing the flexible yarn-filled sleeves against each other to a given degree deforming the sleeves to conform to each other within the endless member and to conform the sleeves to the configuration of the endless member so as to fill the area bounded thereby, while leaving said ends of said yarns exposed, removing the sleeves while retaining the yarns within the area bounded by said endless member, so that after the sleeves are removed the space within said endless member is filled only by the yarns which are pressed against each other in side-by-side relation with said ends thereof still exposed, adhering a support to said exposed ends of said yarns, and then removing the yarns from the area surrounded by said endless member while the yarns remain adhered to said support, so that the latter together with said yarns form the article which has the non-woven pile, said yarns, except for adhering to said support, remaining at all times unconnected and separate from each other.

2. A method of manufacturing an article having a non-woven pile, comprising the steps of arranging within a given area, defined and bounded by the endless inner surface of a confining structure whose configuration determines the configuration of said area, a plurality of flexible open-ended sleeves each having arranged therein a plurality of yarns pressing against each other in side-by-side relation and respectively having exposed ends located adjacent each other, with each sleeve having a length sufficiently great to retain the yarns stably therein during handling of the sleeves with the yarns therein, pressing said flexible yarn-filled sleeves against each other to a predetermined extent with said sleeves deforming each other so as to conform to each other within the confining structure, filling the latter, and with the outermost sleeves being deformed by pressing against said inner surface to conform to the configuration thereof, and while leaving said ends of said yarns exposed, removing the sleeves from said area while retaining said yarns therein so as to provide in said area a filling of said yarns pressed against each other in side-by-side relation with their ends still exposed, adhering to said exposed ends a flexible backing whose configuration conforms generally to that of said area with said backing aligned substantially with said area so that said yarns become attached at their ends to said backing, and then removing the backing with the yarns adhering thereto from the area bounded by said confining structure so as to provide the article which is formed by said backing and the yarns adhering thereto, said yarns, except for adhering to said flexible backing, remaining at all times unconnected and separate from each other.

3. A method of manufacturing a garment trimming having a non-woven pile, comprising the steps of placing within an area whose configuration conforms to that of the desired trimming a plurality of open-ended flexible sleeves each filled with yarns situated within each sleeve in side-by-side relation pressed against each other with the yarns in each sleeve respectively having exposed ends and with each sleeve having a length sufficiently great to retain the yarns stably therein during handling of the sleeves, maintaining all of the sleeves within said area pressing against each other with a predetermined degree of pressure which deforms said sleeves so that they conform to each other filling said area and conforming at their outer periphery to the configuration of said area and with all of said yarn ends remaining exposed, removing the sleeves from the yarns while retaining the latter in said area so as to provide a field of yarns pressed against each other to a given extent, having exposed ends, and providing the field with the configuration of the desired trimming, adhering to the exposed ends of the yarn a flexible backing whose configuration conforms generally to that of the desired trimming, and then removing the backing together with the yarns adhering thereto from the desired trimming having the non-woven pile, said yarns, except for adhering to said backing, remaining at all times unconnected and separate from each other.

4. The method of claim 3 and wherein said backing is a woven fabric of yarns identical with those which are adhered to said backing.

5. A method of manufacturing a garment collar comprising the steps of packing into an area whose configuration conforms to that of the collar a plurality of flexible open-ended sleeves each filled with yarns pressed against each other in side-by-side relation and having exposed ends, respectively with said sleeves each having a length sufficiently great to retain the yarns stably therein during handling of the sleeves with the yarns therein, maintaining the yarns exposed at said ends thereof and giving to the flexible sleeves a predetermined degree of pressure against each other, deforming said sleeves so that they conform to each other filling said area with the peripheral sleeves also being deformed to conform to the configuration of said area, slipping the sleeves from the yarns while retaining the latter in the area whose configuration conforms to that of the desired collar, adhering to the exposed ends of the yarns a collar backing whose configuration conforms to that of the desired collar and with the backing substantially aligned with the area which is filled by the yarns, and then removing the backing with the yarns adhering thereto from said area so as to provide the desired collar, said yarns, except for adhering to said backing, remaining at all times unconnected and separate from each other.

6. A method of making a collar as recited in claim 5 and wherein said yarns are of a hair-like texture and are long enough to have distant from said backing exposed ends which lie against each other and extend in the same general direction as said backing to provide a soft fleecy article.

7. A method as recited in claim 5 and wherein said backing is in the form of a fabric woven from yarns identical with those which are adhered to said backing.

8. A method of manufacturing a decorative article having a non-woven pile comprising the steps of arranging a plurality of open-ended sleeves of polygonal cross section according to a predetermined pattern with said sleeves filled with elongated yarns pressed against each other in side-by-side relation within the sleeves so that the ends of the yarns are exposed, filling the spaces between the polygonal sleeves with open-ended flexible sleeves also filled with yarns pressed against each other in side-by-side relation and having exposed ends, while pressing said open-ended flexible sleeves against each other with a pressure sufficiently great to deform said flexible sleeves so that they conform to each other and to the configuration of the spaces between the polygonal sleeves, removing the flexible sleeves so as to leave the yarns formerly confined therein within the spaces between the polygonal sleeves supporting and engaging the polygonal sleeves to maintain the latter in their predetermined arrangement, then removing the polygonal sleeves while retaining the yarns therein within the areas defined by the yarns which initially were in the flexible sleeves, and finally adhering a backing to the exposed ends of all of the yarns so that the yarns will project from the backing while providing the decorative pattern determined by the initial positioning of said sleeves, said yarns, except for adhering to said backing, remaining at all times unconnected and separate from each other.

References Cited

UNITED STATES PATENTS

| | | | |
|---|---|---|---|
| 1,956,594 | 5/1934 | Rindskopf | 161—62 XR |
| 2,809,909 | 10/1957 | Chatanay | 156—72 XR |
| 3,085,922 | 4/1963 | Koller | 161—67 XR |

OTHER REFERENCES 790,498    2/1958    Great Britain.

ROBERT F. BURNETT, Primary Examiner

R. H. CRISS, Assistant Examiner

U.S. Cl. X.R.

2—98; 156—292; 161—9, 32, 67, 169